Patented July 28, 1953

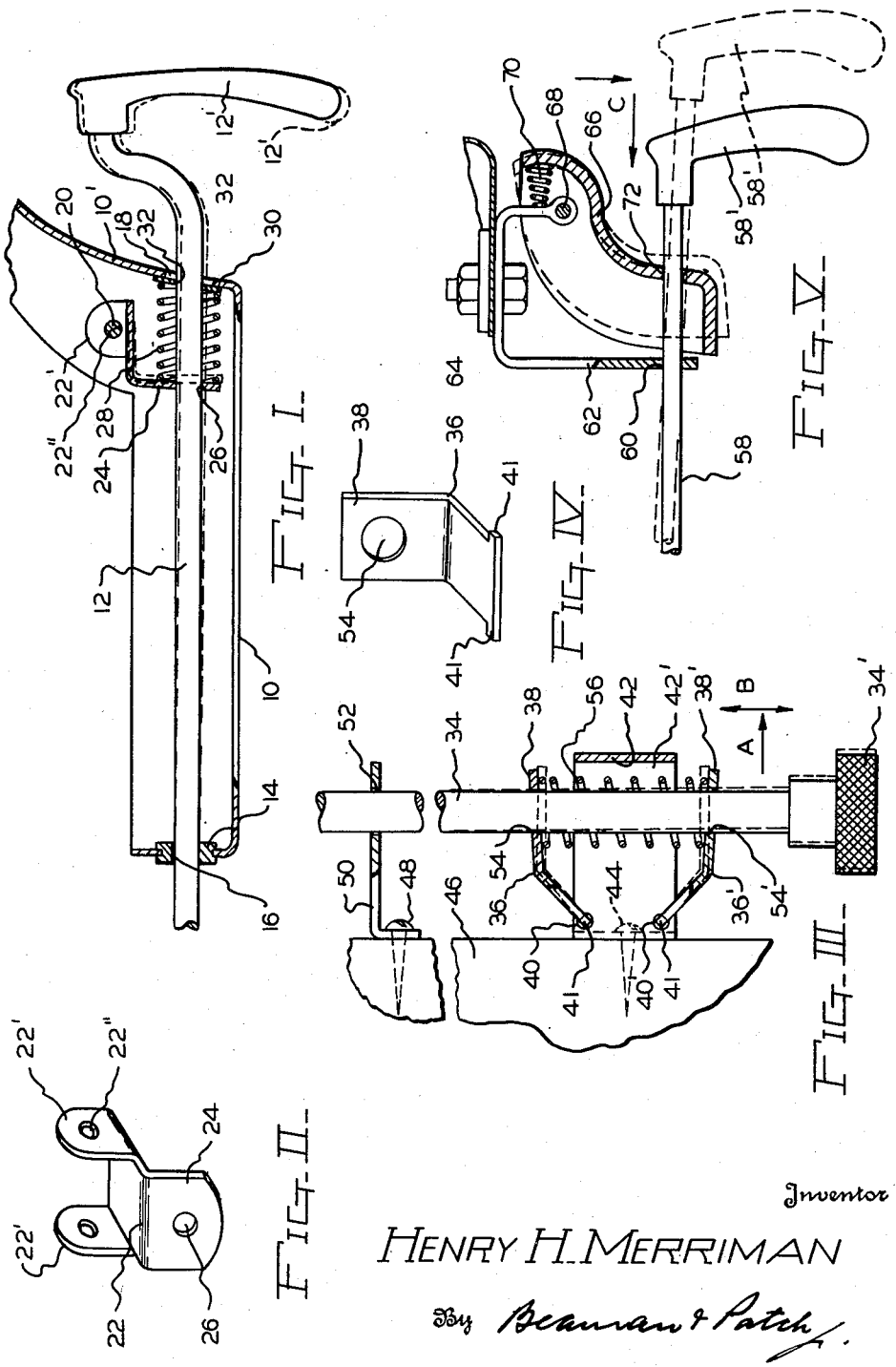

2,646,694

UNITED STATES PATENT OFFICE 2,646,694

LONGITUDINALLY SHIFTED ACTUATOR ROD WITH AUTOMATIC LOCKING ACTION AND RAPID RELEASE

Henry H. Merriman, Jackson, Mich.

Application December 16, 1948, Serial No. 65,626

2 Claims. (Cl. 74—503)

This invention relates to control apparatus of the kind which employs an elongated actuator rod or bar mounted to be moved by a pull or push action, or both, to effect the desired actuating operation and which is applicable to a variety of purposes, among which may be specified the actuation of automobile emergency brakes, dampers, ventilators, or transom windows.

It is an object of the invention to provide an improved form of control apparatus of the above kind which is of simple construction and incorporates an automatic locking or clutching action operable to hold the actuator rod or bar in a locked position automatically upon an axial shifting thereof being arrested, while permitting ready release of the lock or clutch by deliberate pressure applied to displace the actuator rod or bar transversely to its direction of axial motion.

It is a further object of the invention to provide a control apparatus comprising an axially slidable actuator rod or bar which when adjusted axially in one direction is automatically held locked against axial movement in the opposite direction unless such movement is accompanied by a bodily displacement of the actuator rod or bar transversely to its direction of axial movement.

It is thus an object of the invention to provide a control apparatus in which an actuator rod or bar is free to be slid axially in one direction but must be pushed aside to release a locking or clutching device before the rod or bar can be slid in the opposite direction, the locking or clutching device coming into operation automatically to hold the rod or bar locked in an infinite number of positions in the one direction of axial adjustment thereof.

These and other objects and advantages residing in the construction, combination and arrangement of parts will become apparent and be clearly understood from a consideration of the following description with reference to the accompanying drawings in which:

Fig. I is a side view, partly in section, of one form of the invention, as applied to an emergency brake control for use on an automobile, the actuator rod or bar being shown broken away at one end for ease of illustration and being subjected to an automatic locking action in one direction of axial movement thereof, Fig. II is a detail view showing, in perspective, the pivoted canting or locking plate employed in the embodiment according to Fig. I, Fig. III is a side view, partly in section, of another form of the invention, as applied to a control apparatus for the opening and closing movements of a member such as a damper, ventilator or transom window and providing an automatic locking action both on push and pull of the actuator rod or bar, Fig. IV is a detail view showing, in perspective, one of the canting or locking plates employed in this embodiment of the invention, and Fig. V is a side view, partly in section, of yet another form of the invention applied to an automatic emergency brake control, the actuator rod or bar being broken away and subjected to an automatic locking action in a pushing direction of axial movement thereof.

Referring to the drawings, and first to Figs. I and II, 10 is a supporting structure for an elongated axially slidable actuator rod or bar 12 having a hand grip 12' the supporting structure being of channel section and being adapted for attachment to the underside of the instrument panel or other suitable part of an automobile.

At one end, the structure 10 is provided with a bearing 14 having an opening 16 axially aligned with an elongated slot 18 in the opposite end of said structure, while within the latter there is pivotally mounted, at 20, a crank member 22 having a canting or locking plate portion 24 provided with an aperture 26 through which the rod or bar 12 extends while guided for axial movement in the aforesaid opening 16 and elongated slot 18.

It is to be noted (and the purpose of which is to permit limited transverse displacement of the actuator rod or bar, as will be described later) that the opening 16 provides a clearance fit with respect to the actuator rod or bar 12 the extent of which, however, is substantially less than that offered by the substantially laterally spaced and elongated slot 18, whereas the aperture 26 offers merely a sliding fit for the actuator rod or bar 12.

The member 22 is employed in association with a coil spring 28, one end of which bears against the canting or locking plate 24 and the opposite end of which bears against a washer 30 having an aperture 32 through which the actuator rod or bar extends and which washer is maintained in sliding contact with the inside of the wall 10' of the structure 10.

It is to be noted that the effective pivot 20 for the canting or locking plate 24 is laterally displaced with respect to the aperture 26 an extent sufficient to prevent the occurrence of a wedge locking action tending to prevent or interfere with a transverse displacement of the actuator rod or bar 12 to swing the member 22 against the action of the spring 28, automatically into the release position indicated in dotted lines in Fig. I.

The construction and arrangement is such that the spring 28 normally operates to urge the plate 24 into the canted position, as indicated in full lines, in which it exerts a friction grip upon the rod or bar 12, in a well known manner, and in this instance operates automatically to prevent an axial pushing movement of the rod or bar to the left, as viewed in Fig. I, but permits a free axial pulling movement of the rod or bar to the right.

When this control apparatus is installed in position the hand grip 12' would be located in a readily accessible position, and would extend, for instance, from beneath the instrument panel of an automobile, whereas the rear end of the actuator rod or bar (that is the left-hand end as seen in Fig. I) would be connected in any suitable manner to the brake applying means (not shown).

When thus installed the brake can be applied simply by pulling upon the actuator rod or bar, through the medium of the hand grip 12', to produce axial movement of the rod or bar in this direction but a pushing movement of the rod or bar 12 in the opposite direction is positively prevented due to the action of the normally canted plate 24 and its biasing spring 28 unless such pushing movement is accompanied by a transverse bodily displacement of the rod or bar (to the dotted position as shown in Fig. I) to swing the member 22, and hence the canting plate 24, to the friction release position in which the opening 26 has no friction or biting engagement with the rod or bar.

With the employment of a plain or smooth surfaced actuator rod or bar 12, as shown, it is possible to obtain an automatic locking of the rod or bar at an infinite number of positions along the rod or bar and this immediately the pull on the latter is ceased. In this way there is no lost motion whatever, as compared with a ratchet and pawl arrangement where an exact relative positioning of the pawl with respect to the ratchet teeth is necessary to obtain the desired lock, and the maximum pulling and adjusting effort is thus obtainable.

The entire arrangement is of the simplest possible construction, involves a minimum of parts and eliminates the need for precision and complicated manufacturing operations, while providing an exceedingly useful and efficient control unit in practice.

The actuator rod or bar 12 is merely required to partake of axial sliding motion with respect to the supporting structure and the openings 16, 26 and 18 and can, therefore, be of any desired and convenient cross section while, further, a precise or accurate straight condition thereof is not essential since the adjustment possibility afforded permits the employment of a somewhat "out-of-true" rod or bar.

In Fig. II the canting member 22 is shown provided with side ears 22' affording pivot openings 22" for the pivotal mounting of the member.

Referring to Figs. III and IV the same basic principles of construction and operation are utilized to control the actuation of an actuator rod or bar 34 for controlling the opening and closing movements of a member (not shown, but which may consist, for example, of furnace or other damper plate, or a fanlight or transom window) but in this instance the rod or bar has the possibility of an actuating movement in either direction by the employment of a pair of automatically operating pivoted members 36, 36', each having a canting or locking plate 38, 38' and pivotally mounted at 40, 40' upon a stirrup plate 42 secured, as by screw means 44, upon a fixed structure 46, constituting for instance part of a door or window frame structure. The latter also serves to support, as by screw means 48, an angle plate 50, having an aperture 52 through which the actuator rod or bar slidably extends and with respect to which the apertures 54, 54' in the canting or locking plates 38, 38' are capable of being axially aligned upon the rod or bar or of being pushed aside i. e. displaced transversely to its direction of axial sliding motion, to swing the members 36, 36' from their normally canted and operative positions, as shown in full lines, to their dotted line positions.

The actuator rod or bar 34 extends through the loop 42' of the stirrup 42 and the sides of the loop are shown as formed with pivot anchoring apertures 40 for integral pivot forming lugs 41.

A coil spring 56 bearing at its ends against the opposed canting plates 38, 38' serves to urge the the latter into their normal canted position, as shown in full lines, in which they maintain a friction grip on the actuator rod or bar 34 sufficient to hold the latter locked against axial sliding movement in either direction.

A hand grip 34', shown as a knurled knob, at the lower end of the actuator rod or bar facilitates the hand actuation of the latter, first to push the latter aside and to the right, as indicated by the arrow A, and then to slide the rod or bar axially either upwards or downwards, as indicated by the arrows B. Pushing the actuator rod or bar to one side causes the canting plate members 36, 36' to be swung inwards towards each other, against the action of the spring 56, to thereby remove the canting plates from their friction locking engagement with the actuator rod or bar, whereupon the latter is then free to be slid axially, by a push or pull action, to perform the desired control operation e. g. the opening or closing adjustment of a transom window. When such pushing or pulling motion is ceased and immediately so, the canting plates are automatically effective to hold the actuator rod or bar against further axial movement, the one canting plate member operating as to the one direction, and the other as to the opposite direction, unless and until sideway pressure is brought to bear upon the actuator rod or bar to straighten the canting plates as above indicated.

While this particular embodiment has been illustrated with the canting plate members pivoted in laterally spaced relation it is possible to obtain the required action with the employment of a common pivotal axis for the two plates.

The illustrated embodiment according to Fig. V operates similarly to that according to Fig. I and has an emergency brake actuator rod or bar guided for axial sliding adjustment through an aperture 60 in a depending portion 62 of a supporting structure 64 fixedly secured to a suitable part of an automobile under the control of a canting plate member 66 pivotally mounted at 68 and spring biased, by the spring 70, into the full line position in which the aperture 72 in the canting plate exerts a friction grip upon the rod or bar 58 to hold the latter against axial movement to the left, as indicated by the arrow C, but leaves the rod or bar free to be shifted axially to the right. To free the actuator rod or bar for axial shifting to the left the handle grip 58' on the rod must be pressed down to cause the canting plate member 66 to be swung about its pivot 68 into the dotted position in which the friction grip on the actuator rod or bar is released.

Having thus described my invention, what I desire to secure by Letters Patent is:

1. A canting plate and slidable rod assembly constituting a releasable lock for the rod with respect to relative axial movement comprising a supporting structure, a rod having a smooth surface portion, means supporting said rod for both axial and lateral displacement with respect to said portion, a canting plate having an opening defined therein to receive the smooth surface portion of said rod with a sliding fit when the axis of the opening substantially coincides with that of said rod portion, a pivot for supporting said plate from said structure for swinging movement along said rod portion to angularly dispose the axis of said opening with respect to the axis of said rod portion to bite said rod portion to restrain the same against relative movement through said opening, said pivot being axially spaced along said rod portion with respect to said opening with the axis of said opening substantially coinciding with that of said rod portion, a spring reacting between said structure and said plate tending to swing said plate about said pivot into a position in which the opening-defining portion of said plate bites into said rod portion, the thrust of said spring against said plate acting to move said rod portion carried therein toward said pivot with said movement solely restrained by the bite between said opening and said portion, said rod having clearance with said structure for lateral movement away from said pivot to rock said plate from its biting position with respect to said rod portion into a position at which the axis of said opening and the axis of said rod portion coincide whereby said rod portion is slidable within said opening.

2. A canting plate and slidable rod assembly as defined in claim 1 wherein said plate is of angular construction providing a lever arm for rocking said plate from the position of bite to the position at which the axis of said rod portion and the axis of said opening coincide through lateral displacement of said rod away from said pivot.

HENRY H. MERRIMAN.

References Cited in the file of this patent
UNITED STATES PATENTS

| Number | Name | Date |
|---|---|---|
| 1,394,645 | Schmidt | Oct. 25, 1921 |
| 1,659,898 | Simpson | Feb. 21, 1928 |
| 1,894,458 | Altgelt | Mar. 9, 1928 |
| 2,170,900 | Jandus | Aug. 29, 1939 |
| 2,303,586 | Snell | Dec. 1, 1942 |